(12) United States Patent
Sporton et al.

(10) Patent No.: US 9,769,670 B2
(45) Date of Patent: Sep. 19, 2017

(54) MONITORING OF SIGNALLING TRAFFIC

(71) Applicant: VODAFONE IP LICENSING LIMITED, Newbury, Berkshire (GB)

(72) Inventors: Simon Sporton, London (GB); Timothy Sutherns, London (GB); Oliver Sauder, London (GB)

(73) Assignee: VODAFONE IP LICENSING LIMITED, Newbury, Berkshire (GB)

( * ) Notice: Subject to any disclaimer, the term of this patent is extended or adjusted under 35 U.S.C. 154(b) by 0 days.

(21) Appl. No.: 14/933,829

(22) Filed: Nov. 5, 2015

(65) Prior Publication Data

US 2016/0127908 A1 May 5, 2016

(30) Foreign Application Priority Data

Nov. 5, 2014 (EP) .................................... 14191841

(51) Int. Cl.
| | |
|---|---|
| *H04M 1/66* | (2006.01) |
| *H04M 1/68* | (2006.01) |
| *H04M 3/16* | (2006.01) |
| *H04W 12/12* | (2009.01) |
| *H04W 12/02* | (2009.01) |
| *H04L 29/06* | (2006.01) |

(Continued)

(52) U.S. Cl.
CPC ......... *H04W 12/12* (2013.01); *H04L 63/1425* (2013.01); *H04L 63/1466* (2013.01); *H04L 63/1483* (2013.01); *H04M 15/58* (2013.01); *H04W 12/02* (2013.01); *H04M 15/47* (2013.01); *H04Q 2213/13527* (2013.01); *H04W 4/12* (2013.01)

(58) Field of Classification Search
CPC ....... H04W 12/12; H04W 12/02; H04W 4/12; H04L 63/1425; H04L 63/1466; H04L 63/1483; H04M 15/58; H04M 15/47; H04Q 2213/13527
USPC ...................................... 455/410, 411, 414.1
See application file for complete search history.

(56) References Cited

U.S. PATENT DOCUMENTS

| | | | |
|---|---|---|---|
| 8,176,527 B1 | 5/2012 | Njemanze et al. | |
| 8,259,568 B2 * | 9/2012 | Laudermilch | H04W 48/02 370/229 |

(Continued)

FOREIGN PATENT DOCUMENTS

| | | |
|---|---|---|
| WO | WO 95/35633 A2 | 12/1995 |
| WO | WO 03/083660 A1 | 10/2003 |

OTHER PUBLICATIONS

European Search Report for EP 14 19 1841 dated Jul. 31, 2015.

*Primary Examiner* — Marceau Milord
(74) *Attorney, Agent, or Firm* — Workman Nydegger

(57) ABSTRACT

Signalling messages may be monitored in a telecommunications network by receiving an indication of a signalling message for a network entity of the telecommunications network, the signalling message comprising a signalling dialog identifier. The signalling dialog identifier of the received signalling message is compared with a list of known signalling dialog identifiers relating to the network entity and the signalling message is categorized based on a result of the step of comparing, for example as suspicious. If a number of signalling messages for a network entity of the telecommunications network categorized as suspicious and having a common additional characteristic is at least a threshold value, an alert may be generated.

10 Claims, 4 Drawing Sheets

(51) Int. Cl.
*H04W 4/12* (2009.01)
*H04M 15/00* (2006.01)

(56) References Cited

U.S. PATENT DOCUMENTS

| | | | | |
|---|---|---|---|---|
| 8,520,615 | B2* | 8/2013 | Mehta | H04W 8/082 370/329 |
| 8,582,567 | B2* | 11/2013 | Kurapati | H04L 29/06027 370/352 |
| 2003/0188189 | A1 | 10/2003 | Desai et al. | |
| 2005/0078660 | A1* | 4/2005 | Wood | H04L 12/5692 370/352 |
| 2006/0235796 | A1* | 10/2006 | Johnson | G06Q 20/02 705/44 |
| 2007/0121596 | A1* | 5/2007 | Kurapati | H04L 29/06027 370/356 |
| 2008/0137593 | A1* | 6/2008 | Laudermilch | H04W 48/02 370/328 |
| 2008/0292077 | A1* | 11/2008 | Vinokurov | H04M 3/436 379/142.04 |
| 2010/0105355 | A1* | 4/2010 | Nooren | H04L 63/20 455/410 |
| 2010/0112993 | A1* | 5/2010 | Peng | H04W 12/12 455/415 |
| 2011/0202466 | A1* | 8/2011 | Carter | G06Q 20/3674 705/67 |
| 2012/0278886 | A1 | 11/2012 | Luna | |
| 2014/0164776 | A1* | 6/2014 | Hook | H04L 9/14 713/171 |
| 2014/0333415 | A1* | 11/2014 | Kursun | G06F 21/32 340/5.83 |
| 2015/0381666 | A1* | 12/2015 | Rustogi | H04L 65/1006 370/352 |
| 2016/0006753 | A1* | 1/2016 | McDaid | H04L 63/1425 726/23 |
| 2016/0012465 | A1* | 1/2016 | Sharp | G06Q 20/18 705/14.17 |

* cited by examiner

| ref | Node sending TC-BEGIN | | | Node receiving TC-BEGIN | | |
| --- | --- | --- | --- | --- | --- | --- |
| | GT | tid | Requested AC | GT | tid | Accepted AC |
| 1 | +447771234567 | 3342 | networkLocUpContext-v3 | +39123453265 | - | - |
| 2 | +49123575635 | 967 | locationCancellationContext-v3 | +447771234567 | - | - |
| 3 | +447779876543 | 1876 | networkLocUpContext-v3 | +33294242462 4 +332475363534 | 4305 | networkLocUpContext-v3 |
| 4 | +447775463544 | 2241 | networkLocUpContext-v3 | +1123456789 | 132 | networkLocUpContext-v3 |
| ... | ... | ... | ... | ... | ... | ... |

Fig. 4

MONITORING OF SIGNALLING TRAFFIC

CROSS REFERENCE TO RELATED APPLICATIONS

This application claims benefit and priority to European Application Number EP 14191841.7, filed on Nov. 5, 2014, the entirety of which is incorporated herein by reference.

TECHNICAL FIELD OF THE INVENTION

The invention concerns a method of monitoring signalling messages in a telecommunications network, a network protection device and network entity.

BACKGROUND TO THE INVENTION

Signalling System Number 7 (SS7) is used between mobile networks to enable various functions including: supporting voice interconnection; roaming mobility management; and internetwork Short Message Service (SMS). SS7 was developed before the Internet age, where large, normally state-owned organisations, ran telephone networks. Little time was spent protecting the protocols from abuse as it was thought that the barriers to entry were sufficiently high to protect networks. Mobile networks typically use SS7 to pass information about roaming customers, ensuring that such customers can register on networks and receive their calls or text messages.

With the introduction of Internet Protocol (IP) as an alternative transport layer, SS7 is now much more available to those who would want to abuse it. Examples of this abuse that impact customers and the network include:
- HLR lookup—for example see http://gateway.txtnation.com/solutions/networklookup/numberqueries/numberlookup?ads=google&ppc=globalhlr;
- location tracking—for example see http://www.washingtonpost.com/business/technology/for-sale-systemsthat-can-secretly-track-where-cellphone-users-go-around-theglobe/2014/08/24/f0700e8a-f003-11e3-bf76-447a5df6411f_story.html;
- Anti-Steering of Roaming (A-SoR), which tries to overcome a network operator's ability to direct their roaming customers to a preferred network operator, increasing costs for customers and has been banned by GSMA (see http://pctelecoms.blogspot.co.uk/2010/04/anti-sor-activities-banned-bygsms-barg.html); and
- badly (or maliciously) designed Machine-to-Machine (M2M) systems—these solutions have sent SS7 traffic into networks, but with no associated financial payment.

One problem with detecting fraudulent use of SS7-based application protocols is that the number of abusive signalling messages may be small within the mass of legitimate traffic. Some types of traffic can be identified as illegitimate, especially where the attacker's aim is to extract customer information from the network and there are existing approaches to protect against malicious such traffic. However other types of illegitimate behaviour may be more difficult to detect, as a range of unusual, but legitimate types of signalling are also identifiable.

A particular concern is where an attacker's aim is to disrupt the network, or send undesirable information into the network, such as sending fraudulent SMS traffic towards subscribers. In these cases, the attacker will hide their identity by 'spoofing' (mimicking or imitating) all originating addresses used in the SS7 protocols. Detecting such traffic, where its originator may be difficult or even impossible to identify and the type of traffic is often similar to legitimate forms of signalling behaviour remains challenging.

SUMMARY OF THE INVENTION

Against this background, there is provided a method of detecting undesirable signalling traffic received at a telecommunications network (especially a mobile telecommunications network), a corresponding network protection device and a corresponding network entity. Such a device or entity may be embodied as a computer program, programmable logic, firmware or other configurable system. Other preferred features are disclosed with reference to the claims and in the description below.

Some types of illegitimate signalling traffic towards a network may include requests that cause a detrimental effect without the originating entity needing to receive a response to their request. This may be achieved by 'spoofing' (mimicking or imitating) another legitimate network entity, so that the signalling messages are not rejected by the network being attacked. Responses to the illegitimate requests are then sent by the attacked network to the spoofed network, which typically ignores them as being in error. However, it has been recognised that detecting such signalling messages can be achieved by looking at these responses received at the spoofed network, instead of (or in addition to) looking at the attacked network. Responses that do not tally with a request made by the network may indicate that an address for one of the network's entities may have been spoofed.

An indication of a signalling message for a network entity of a telecommunications network is received. This may take place at the recipient of the message, or at another network entity, which may be termed a monitoring node. The signalling message need not be received by the entity receiving the indication, although it can do so in embodiments. The signalling message comprises a signalling dialogue identifier, specific optional details of which will be discussed below. The signalling dialogue identifier of the received signalling message is compared with a list of known signalling dialogue identifiers relating to the network entity and the signalling message can then be categorised based on a result of the step of comparing.

SS7 signalling typically uses the Transaction Capabilities Application Part (TCAP) protocol, so the invention will be explained with reference to this, but it will be understood that it may be applied to other protocols and systems. In this context, a network node may collect details of all open Transaction Capability (TC) dialogues occurring between network elements via the SS7 signalling protocol (the signalling dialogue identifier noted above). The initial transmission, TC-BEGIN, is stored in a list at the monitoring node and compared to subsequent TC-CONTINUE, TC-END and TC-ABORT messages. Thus, different signalling messages may have different types. If no records match the parameters stored in the list for the initial TC-BEGIN, the associated TC-CONTIUNE, TC-END or TC-ABORT can then be identified and optionally logged as potentially malicious or at least suspicious.

Although the method may not therefore identify the malicious party (due to the inherent nature of the SS7 protocol), it does advantageously provide the network operator whose identity is being spoofed by a malicious entity with sufficient information to initiate further investigations. It may also allow the spoofed operator to dispute any charges associated with the spoofed messages (for instance, SMS termination charges) by proving the messages did not originate from within their network.

In another aspect, the number of signalling messages identified as suspicious may be relevant. If it is determined that a number of signalling messages for a network entity of the telecommunications network categorised as suspicious and having a common additional characteristic is at least a threshold value, an alert may be generated. The common additional characteristic of the signalling messages may be that they all originate from the same telecommunication network, that they all originate from the same network entity; that they all are in respect of the same mobile terminal (or subscriber), and/or that they all have the same type, for example that they all have the same MAP operation code.

BRIEF DESCRIPTION OF THE DRAWINGS

The invention may be put into practice in various ways, one of which will now be described by way of example only and with reference to the accompanying drawings in which:

FIG. 4 illustrates the content of a list of open dialogues stored in a monitoring node, to help explain an embodiment in operation.

DETAILED DESCRIPTION OF A PREFERRED EMBODIMENT

Figure 1:
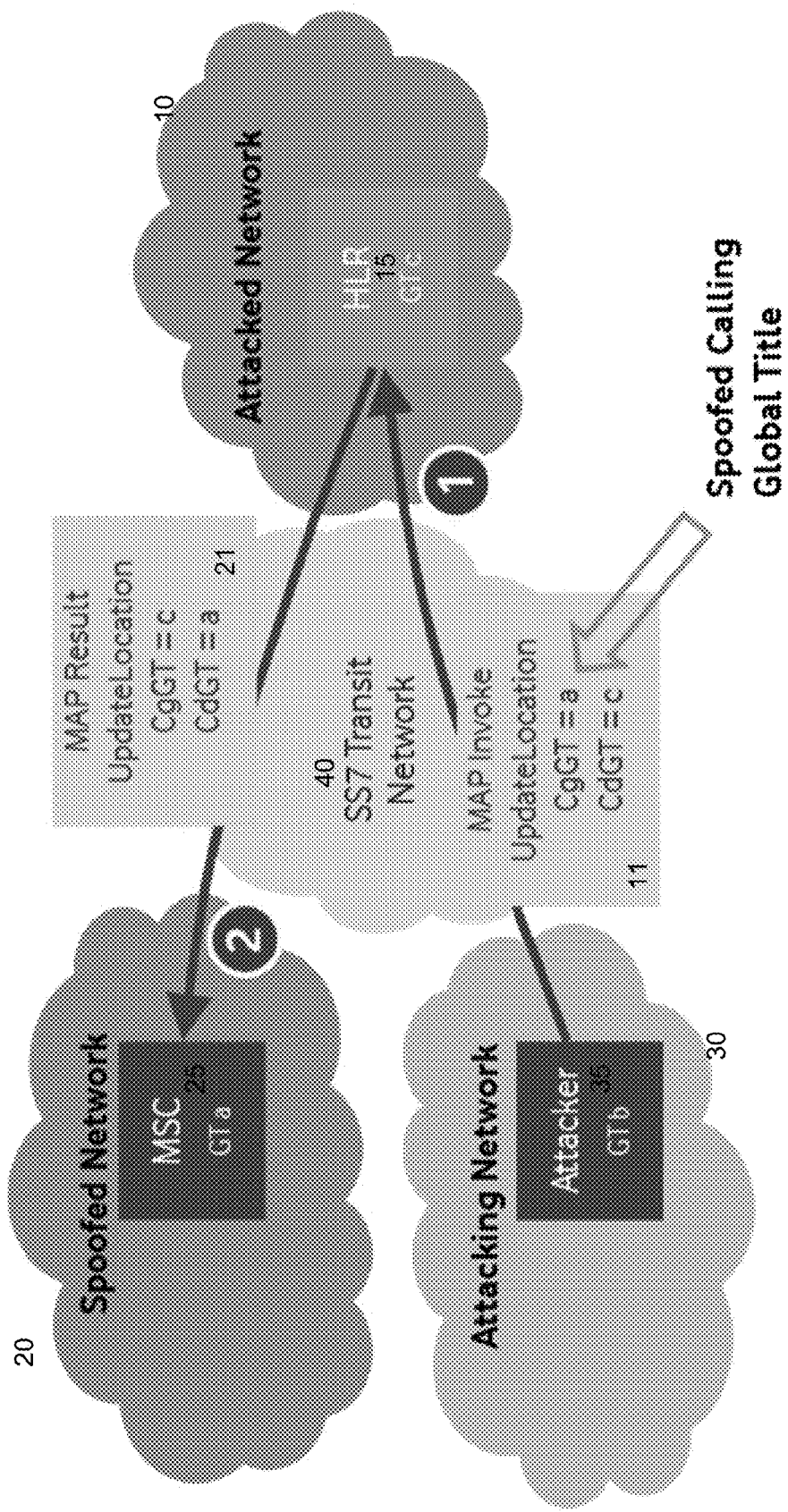
FIG. 1 shows a schematic diagram illustrating an example of a malicious signalling message being sent to an attacked network.

Referring first to FIG. 1, there is shown a schematic diagram illustrating an example of a malicious signalling message being sent to an attacked network 10. An attacking network 30 generates an attacking message 11. In the example shown, the attacker network entity 35, having a Signalling Connection Control Part (SCCP) Global Title (GT) b, sends this message 11 to the Home Location Register 15, having a GT c, in the attacked network 10, entering at first point 1. The message is transported through the SS7 Transit Network 40. The message 11 identifies the originator of the message as GT a. This is the identity of a Mobile Switching Centre (MSC) 25 in another network, a spoofed network 20. The MSC may be combined with a Visitor Location Register (VLR).

Thus, the attacker entity 35 has spoofed the SCCP Calling Global Title (CgGT) address of MSC 25. In this case, it is not possible to differentiate malicious traffic from legitimate traffic when it enters the attacked network 10, as the SS7 Transit network used for international connectivity hides the true origin of the traffic.

It has been recognised that use can be made of the fact that Mobile Application Part (MAP) is generally an acknowledged protocol (and this may be true of other signalling protocols used as well). Thus, it is worth considering a response message 21 that the attacked network 10 will send back to the spoofed network 20, which is the network it believes sent a request, entering at second point 2. In other words, it may be worth monitoring signalling (for example, MAP) messages at networks other than the intended target, which in this case means rather than monitoring at first point 1, monitoring needs to occur at second point 2.

In other words, a key aspect may be that all signalling messages received at a telecommunications network may be monitored. For example, this may be done to check for messages that suggest the network's identity may have been spoofed. Another key aspect may be monitoring for unexpected signalling messages received at a telecommunications network, particularly those which appear to be replying to a request made by that network although the network made no such request.

Figure 2:
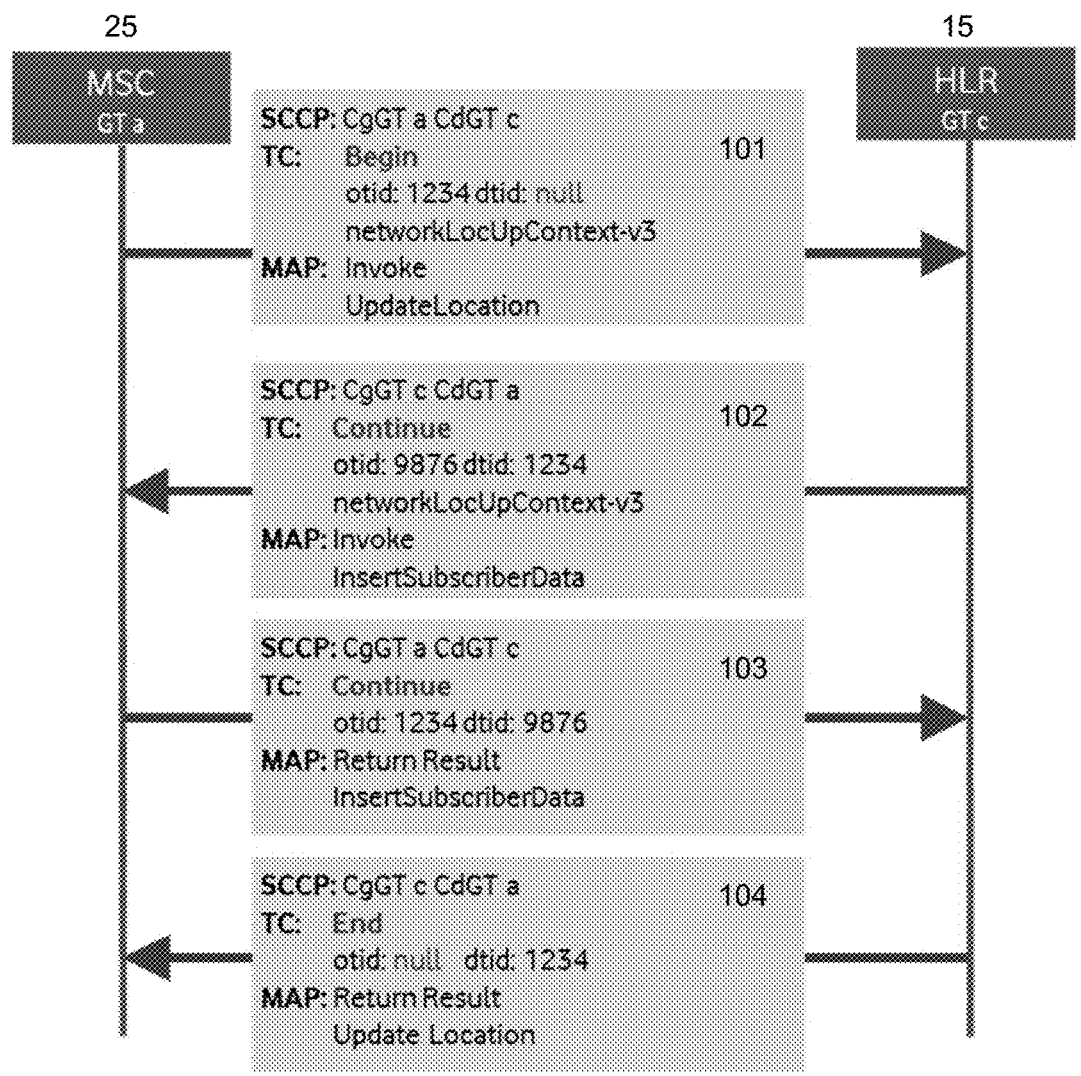
FIG. 2 depicts an example of a known signalling dialogue, to understand the process better.

The specific implementation of this idea may usefully consider the Transaction Capabilities (TC) layer of the SS7 protocol stack. Referring next to FIG. 2, there is depicted an example of a known signalling dialogue, to understand the process better. Where the same features as shown in FIG. 1 are depicted, identical reference numerals have been used. This drawing concerns a typical GSM MAP dialogue between an MSC/VLR 25 performing a MAP Location Update towards the HLR 15, which subsequently sends an Insert Subscriber Data (ISD) towards the MSC/VLR 25. In the drawing, an Originating Transaction Identity (TID) is identified by "otid" and a Destination TID is identified by "dtid".

In the diagram, three layers of the SS7 protocol stack are shown:
  SCCP providing global routeing addresses for messages;
  TC arranging individual messages into structured 'dialogues'; and
  MAP providing the detailed request/response for mobile related activities (such as mobility management).

Additional SS7 layers exist, such as Message Transfer Part (MTP) 1, 2 and 3, but are not of interest in this scenario and are therefore not shown.

All TC dialogues between two respective network elements start with a TC-BEGIN message, have 0, 1 or more TC-CONTINUE messages and finish with a TC-END or TC-ABORT message. As each network element (MSC 25 and HLR 15 in this example) will have multiple dialogues in progress at one time, each node allocates a unique TID to the dialogue. Each response message in a dialogue includes the TID allocated by the far end.

In the spoofing scenario (as shown in FIG. 1), the spoofed network 20 would receive a TC-END message without generating the associated TC-BEGIN which was instead spoofed. Therefore, inspection of the TC layer makes it possible to identify unexpected messages that could be the result of a malicious request to another network.

Figure 3A:
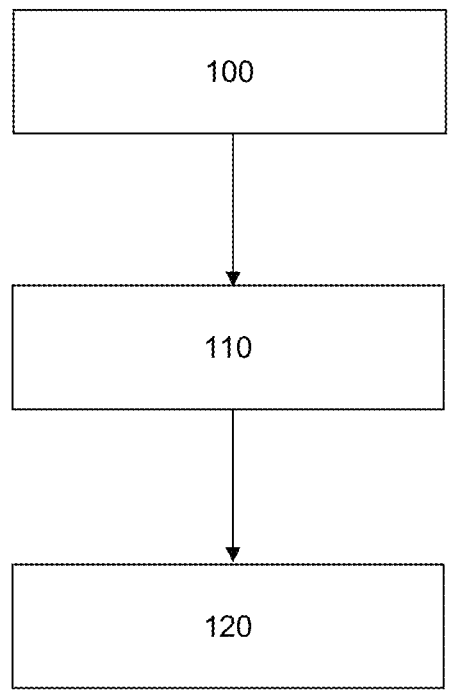
FIG. 3A shows a first flowchart of operations in accordance with an embodiment.

Referring next to FIG. 3A, there is shown a first flowchart of operations in accordance with an embodiment for monitoring signalling messages in a telecommunications network. The signalling message is preferably in accordance with a Signalling System 7 (SS7) protocol stack, for instance using a Transaction Capabilities Application Part (TCAP) protocol. The method may be carried out at the network entity or, more preferably a network protection component associated with the telecommunications network.

In a receiving step 100, an indication of a signalling message for a network entity of the telecommunications network is received. This indication may be at first point 2 of FIG. 1 (for example, a firewall entity or a network protection device), or it may be at a specific network entity, such as the MSC 25). The signalling message comprises a signalling dialogue identifier, such as a TID (and particularly a dialogue identifier associated with the destination network entity, such as a destination TID). In the preferred embodiment, the signalling message further comprises a message type. Advantageously, the message type comprises or is one of: a dialogue initiation message; a dialogue continuation message; and a dialogue termination message. For example, the TC message types discussed above may fall within these categories and there be more than one type of message in each category. Other possible elements of the signalling message may include one or more of: a source identifier; a destination identifier; a routeing part (which may indicate how the message is to be routed and/or include the source and/or destination identifiers, for example an SCCP part); and an instruction part (which may include a message to the recipient, such as an MAP message).

In comparing step 110, the signalling dialogue identifier of the received signalling message is compared with a list of known signalling dialogue identifiers relating to the network entity. This list may be stored at the entity carrying out the comparison or it may be stored at another entity, for example the entity marked as the destination for the message. Compilation of this list will be discussed below.

In categorising step 120, a category is associated with the signalling message based on a result of the step of comparing (for example, whether there was a match or not, the proximity of any match or partial match). The fact that anything other than an exact match was found may be considered worthy of note. In particular, the step of categorising 120 may comprise identifying the signalling message as normal or suspicious.

The preferred embodiment may further base the categorising step 120 on the message type of the signalling message. For instance, the step of categorising may identify the signalling message as suspicious based on the message type being a dialogue continuation message or a dialogue termination message, as these are not messages that initiate a dialogue. If the message type is a dialogue continuation message or a dialogue termination message and the step of comparing results in no match (exact or close, for example within a specific tolerance margin) between the signalling dialogue identifier of the received signalling message and the list of known signalling dialogue identifiers relating to the network entity, the signalling message is preferably categorised as suspicious. Additionally or alternatively, if the message type is a dialogue continuation message or a dialogue termination message and the step of comparing results in a match between the signalling dialogue identifier of the received signalling message and the list of known signalling dialogue identifiers relating to the network entity, the signalling message may be categorised as normal.

Optionally (although not shown), an additional action step may take place in response to the step of categorising identifying the signalling message as suspicious. The action step may comprise, one or both of: generating an alert (which may be communicated to an operator or another network entity); and logging the received signalling message.

Another optional step (also not shown) may comprise storing information about the signalling message (typically based on the indication), preferably together with the categorisation applied to the message. For example, the information stored may comprise one or more of: a source identifier; a destination identifier; a dialogue identifier associated with the source network entity; a dialogue identifier associated with the destination network entity; and information about an instruction part of the message. In this way, a list of signalling messages may be built up, which may be termed a TC dialogue list. This list may be used for comparison with further signalling messages subsequently received.

Generation of an open TC dialogue list for use in the comparing step 110 will now be considered. Referring to FIG. 4, there is illustrated the content of a list of open dialogues stored in a monitoring node, to help explain an embodiment in operation, with the Application context indicated by "AC". The functionality that monitors TC dialogues would build a list of open dialogues, for example each having a reference, a GT for both the initiating node and the recipient node, TIDs associated with both the initiating node and the recipient node, the requested AC and the accepted AC. The requested AC and the accepted AC may correspond with the information about an instruction part of the message noted above.

It should be noted that it is possible for the receiving node to modify the GT it uses as its own address in a dialogue (for example, where an UpdateLocation is routed by E.214 address, the HLR will respond with its E.164 nodal Global Title). Therefore, the list may include multiple GTs for the receiving node and reference 3 in FIG. 4 shows this as an example.

The list is built as follows. All appropriate signalling connections are monitored, for example all interconnect signalling links. For each TC-BEGIN message, a new entry is created in the list including the CgGT, CdGT, otid and application context.

For each TC-CONTINUE message, the list is checked for a matching entry using GTs and TIDs as the index. If a match is found, the record is updated as appropriate for example, the TID is added for the node receiving the TC-BEGIN. If no match is found, then this message may be logged as a potential indication of abusive messages.

For each TC-END or TC-ABORT message, the list is checked for a matching entry using GTs and TIDs as the index. If a match is found, the record may be deleted. If no match is found, this message may be logged as a potential indication of abuse.

Care may need to be taken when reviewing the log of potentially abusive messages. There are a number of legitimate signalling scenarios that can result in unexpected signalling messages or packets, for instance dialogues where messages have been lost in the transit network.

The log may be reviewed for anomalies, such as:
excessive unexpected messages from specific networks;
excessive unexpected messages from specific nodes;
multiple unexpected messages associated with the same customer (subscriber or mobile terminal); and
unexpected messages for specific MAP operations.

This may be understood as an additional step in FIG. 3A (not shown) of identifying an anomalous situation, by determining that a number of signalling messages for the network entity categorised as suspicious and having a common additional characteristic is at least a threshold value.

Figure 3B:
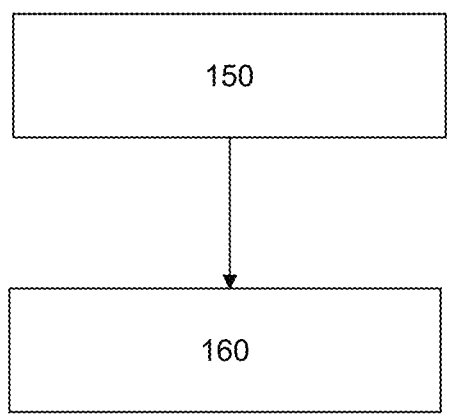
FIG. 3B shows a second flowchart of operations in accordance with an embodiment.

Alternatively, reference may be made to FIG. 3B, in which there is shown a second flowchart of operations in accordance with an embodiment for monitoring signalling messages in a telecommunications network. Each signalling message is categorised as normal or suspicious, in line with the discussion above, such as FIG. 3A.

In a determination step 150, is it identified that a number of signalling messages for a network entity of the telecommunications network categorised as suspicious and having a common additional characteristic is at least a threshold value. The common additional characteristic may comprises one or more of: an originating telecommunication network for the signalling messages; an originating network entity for the signalling messages; a mobile terminal associated with the signalling messages; and an (MAP) operation type associated with the signalling messages. In an alerting step 160, an alert is generated based on the step of determining 150. This may have optional features, as discussed with reference to FIG. 3A.

It should be noted that this analysis will only identify networks or elements or customers who are potentially the victims of abuse rather than the attacker themselves. It does however provide the network operator whose identity that is being spoofed with sufficient information to initiate further investigations. It also allows this operator to dispute any charges associated with the spoofed messages (such as SMS termination charges).

As noted above, the processes of the embodiments described may be implemented using a computer program, configured to carry them out when operated by a processor or other form of (digital) logic. It may be embodied in a a network protection device configured to operate in accordance with any of these methods. For instance, the network protection device may have: an input configured to receive an indication of a signalling message for a network entity of the telecommunications network, the signalling message comprising a signalling dialogue identifier; and a processor, configured to compare the signalling dialogue identifier of the received signalling message with a list of known signalling dialogue identifiers relating to the network entity and to categorise the signalling message based on a result of the comparison. It may have further structural features to correspond with the method steps discussed herein.

A network entity of a telecommunications network may also be provided, that is configured to receive signalling messages from outside the telecommunications network and comprising such a network protection device. This network entity may be configured to act as a firewall on signalling traffic between the telecommunications network and external signalling traffic sources.

Although a specific embodiment has now been described, the skilled person will appreciate that substitutions are modifications are possible. For instance, the protocols used may be changed. The specific order of steps may also be modified.

The invention claimed is:

1. A method of monitoring signalling messages in a telecommunications network, comprising:
   receiving an indication of a signalling message for a network entity of the telecommunications network, the signalling message comprising a signalling dialogue identifier;
   comparing the signalling dialogue identifier of the received signalling message with a list of known signalling dialogue identifiers relating to the network entity;
   categorizing the signalling message based on a result of the step of comparing by identifying the signalling message as normal or suspicious; and
   identifying an anomalous situation, by determining that a number of signalling messages for the network entity that are categorized as suspicious and that have a common additional characteristic, is at least a threshold value,
   wherein the signalling message further comprises a message type and the step of categorizing is based on the message type, wherein the message type comprises one of: a dialogue initiation message; a dialogue continuation message; and a dialogue termination message,
   wherein:
   if the message type is a dialogue continuation message or a dialogue termination message and the step of comparing results in no match between the signalling dialogue identifier of the received signalling message and the list of known signalling dialogue identifiers relating to the network entity, the signalling message is categorized as suspicious; and
   if the message type is a dialogue continuation message or a dialogue termination message and the step of comparing results in a match between the signalling dialogue identifier of the received signalling message and the list of known signalling dialogue identifiers relating to the network entity, the signalling message is categorized as normal.

2. The method of claim 1 further comprising, in response to the step of categorizing identifying the signalling message as suspicious, one or both of:
   generating an alert; and
   logging the received signalling message.

3. The method of claim 1, wherein the step of categorizing identifies the signalling message as suspicious is based on the message type being a dialogue continuation message or a dialogue termination message.

4. The method of claim 1, wherein the signalling message is in accordance with a Signalling System 7 (SS7) protocol stack.

5. The method of claim 1, wherein the signalling message uses a Transaction Capabilities Application Part (TCAP) protocol, the signalling dialogue identifier comprising a transaction ID.

6. The method of claim 1, wherein the method is carried out at the network entity or at a network protection component associated with the telecommunications network.

7. A computer program product, configured, when executed by a processor, to carry out the method of claim 1.

8. A network protection device configured to operate in accordance with the method of claim 1.

9. A network entity of a telecommunications network, configured to receive signalling messages from outside the telecommunications network and comprising the network protection device of claim 8.

10. A method of monitoring signalling messages in a telecommunications network, comprising:
    receiving an indication of a signalling message for a network entity of the telecommunications network, the signalling message comprising a signalling dialogue identifier;
    comparing the signalling dialogue identifier of the received signalling message with a list of known signalling dialogue identifiers relating to the network entity; and
    categorizing the signalling message based on a result of the step of comparing by identifying the signalling message as normal or suspicious;
    wherein the signalling message further comprises a message type and the step of categorizing is based on the message type,
    wherein:
    if the message type is a dialogue continuation message or a dialogue termination message and the step of comparing results in no match between the signalling dialogue identifier of the received signalling message and the list of known signalling dialogue identifiers relating to the network entity, the signalling message is categorized as suspicious; and
    if the message type is a dialogue continuation message or a dialogue termination message and the step of comparing results in a match between the signalling dialogue identifier of the received signalling message and the list of known signalling dialogue identifiers relating to the network entity, the signalling message is categorized as normal.

\* \* \* \* \*